(12) United States Patent
Bolik et al.

(10) Patent No.: US 8,539,562 B2
(45) Date of Patent: Sep. 17, 2013

(54) AUTOMATED MANAGEMENT OF SYSTEM CREDENTIALS

(75) Inventors: Christian Bolik, Oldenburg (DE); Neeta Garimella, San Jose, CA (US); Zhiguo Huang, Oro Valley, AZ (US); Erick C. Kissel, Tucson, AZ (US); Jayashree Ramanathan, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 334 days.

(21) Appl. No.: 12/963,834

(22) Filed: Dec. 9, 2010

(65) Prior Publication Data

US 2012/0151563 A1 Jun. 14, 2012

(51) Int. Cl.
*H04L 9/00* (2006.01)

(52) U.S. Cl.
USPC .............................. 726/6; 713/182

(58) Field of Classification Search
None
See application file for complete search history.

(56) References Cited

U.S. PATENT DOCUMENTS

| | | | |
|---|---|---|---|
| 7,636,852 B1 * | 12/2009 | Balasubramanian et al. | 713/183 |
| 2008/0209221 A1 * | 8/2008 | Vennelakanti et al. | 713/183 |
| 2009/0037984 A1 * | 2/2009 | Andrasak et al. | 726/5 |
| 2010/0100948 A1 * | 4/2010 | Delia et al. | 726/6 |

OTHER PUBLICATIONS

Bertrand Dufrasne, IBM Information Archive Architecture and Deployment, Aug. 2010, ibm.com/redbooks, Tivoli software, 522 pages.

* cited by examiner

*Primary Examiner* — Fikremariam A Yalew
(74) *Attorney, Agent, or Firm* — Kunzler Law Group, pc (57) ABSTRACT

One disclosed aspect of the present invention includes authentication and user account automation within a compute cluster for each cluster node that requires password or other credential administration. For example, a storage appliance computing system may rely on a plurality of subsystems (such as databases, storage management software, and application servers) that each have internal user accounts with associated passwords and credential keys that need to be changed at frequent intervals. Rather than requiring an administrator to manually manage all of these accounts, the presently described invention includes techniques and an authentication manager component to automatically manage, update, and refresh authentication information as required. Further, the authentication manager component may be used to perform and propagate automatic credential changes such as new sets of SSH keys or updated passwords as required within a computing system, and respond to new nodes or out-of-sync credentialing scenarios.

20 Claims, 4 Drawing Sheets

AUTOMATED MANAGEMENT OF SYSTEM CREDENTIALS

FIELD OF THE INVENTION

The present invention generally relates to credentialing and authentication in computing systems. The present invention more specifically relates to automated techniques used for managing system credentials such as passwords and keys in computing system nodes.

BACKGROUND OF THE INVENTION

Appliances that provide customer solutions often need to integrate multiple hardware and software products. This integration requires the management of a number of system and administrative user accounts required by each individual product in the solution stack along with various access and connectivity requirements. For example, many database systems used in appliances require multiple internal user accounts to be created and maintained to allow the database system to function.

In a stand-alone environment, the customer will be responsible for creating and managing these user accounts. In more complex computer systems, many hardware and software products are integrated together and are not intended to be directly exposed to the end users. Therefore, a significant amount of work is required by administrators to ensure access and connectivity requirements are satisfied for each component of the system solution during setup, maintenance, and operation. This is further complicated by security policies which may mandate changes at various intervals. Further, root user accounts may be disabled in the system for security reasons, which makes operational tasks for internal user accounts much more complex.

Solution-based appliances such as storage archive appliances face the challenge of hiding these complex details from the end user and offering a secure, simplified, and unified way to manage each component or product that is used in the solution. However, the overall solution is often dependent on a plurality of subsystems, with each subsystem having associated user accounts that must comply with system policies. Automated techniques are needed to more efficiently manage internal user accounts used in a variety of systems and information solutions.

BRIEF SUMMARY OF THE INVENTION

One aspect of the present invention provides a unified method to manage internal user accounts and facilitate communication across multiple nodes and subsystems in an appliance or other computing system. This enables simplified and secure management of the internal user accounts and authentication tokens from the nodes and subsystems that are needed to fully operate the larger system, while also enabling users and administrators of the computing system to establish regulatory compliance and maintain high security.

As described herein, user accounts for internal users (also known as a "technical user account" or a "system user account") may be completely hidden from end users and administrators in conjunction with automating user account management functions. Each of the user accounts may be managed internally while also automatically changing the passwords or authentication keys for these accounts on a periodic basis. Passwords may be managed across all nodes in the system, and interactive login sessions may be disabled to prevent unauthorized access and control. The updated and managed passwords may then be transmitted to each of the various components and subsystems that need access.

A set of the presently disclosed techniques may also be used to enable recovery from failed password updates or out-of-sync passwords. These techniques also enable nodes and devices to be successfully added or removed from the computing system, while not requiring extensive user intervention to establish the required authentication passwords for the configuration changes.

Further, the presently disclosed techniques may be used to enable consolidation of multiple user accounts into a single account. If the end user desires control, all users of the various subsystems may be represented as a single internal user of the appliance. This allows password updates via user interfaces or other tools. A set of externally visible user accounts may also be consolidated into a single administrative account in order to simplify management and use of accounts having similar or different permissions levels.

In one specific embodiment described herein, a method for performing automated management of credentials in a computing system may include changing passwords for internal or other system user accounts among nodes or dynamically generating a pair of public-private keys and redistributing the public key across a cluster. More specifically, this method involves initially communicating with component internal user accounts in the computing system using a set of default authentication credentials. The authentication credentials of these internal user accounts are changed from default values to a new set of defined authentication credentials, and are tracked in an index.

During normal operation, an authentication manager or other like component will be used to change the authentication credentials from previous sets of defined authentication credentials to subsequent sets of defined authentication credentials (such as by changing passwords or generating new keys), and updating these credentials that are tracked in the index. This update may occur at a regular frequency, such as during each of a series of predefined intervals. The authentication manager will then retrieve the authentication credentials from the index and use these retrieved authentication credentials for accessing the corresponding internal user accounts.

Another specific embodiment of the present invention provides for a computer system comprising a processor, a memory unit, and instructions stored within the memory unit for automated management of credentials in the computing system consistent with the techniques described herein. Additionally, another specific embodiment of the present invention provides for a computer program product for automated management of credentials in a computing system, with the computer program product comprising a computer readable storage medium having computer readable program code embodied therewith to implement the techniques described herein.

DETAILED DESCRIPTION OF THE INVENTION

One aspect of the present invention provides techniques and mechanisms for managing internal user accounts and the appropriate usernames, passwords, tokens, keys, and authentication information that are required within computing system configurations. These techniques and mechanisms enable automated management of the numerous internal user accounts and subsystems that are employed in the larger computing system. Additionally, the presently disclosed techniques enable authentication tokens such as passwords and keys to be updated and synchronized, thereby providing a complete solution for the various authentication activities occurring between various nodes and subsystems.

Figure 1:
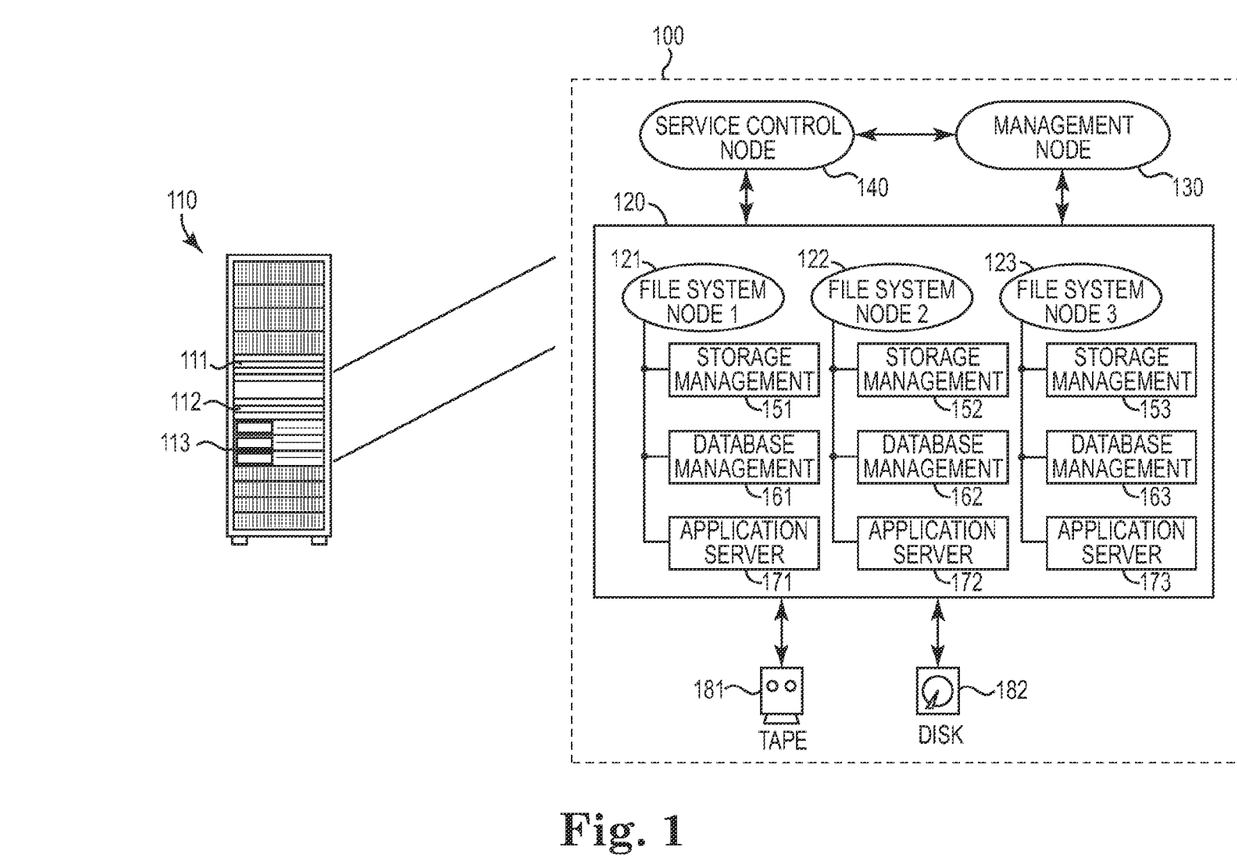
FIG. 1 illustrates a configuration of a storage appliance system used in connection with embodiments of the present invention.

A computer system (such as a data storage appliance) generally operates a number of subsystems and components to perform its internal computing functions. For example, FIG. 1 depicts a storage appliance system 100 featuring a variety of operational hardware subsystems 111, 112, 113. As illustrated and further described, this appliance may be a physical server rack 110 comprising a plurality of coordinating servers. The various servers provide one or more subsystems through a combination of hardware devices and software processes that interface with each other to perform defined actions and commands of the appliance or computer system 100. Although an external user may simply interface with the appliance or computer system 100 as a single system, as the following description indicates, the various subsystems must interact and communicate with each other to perform the actual computing activities of the system.

In the storage appliance depicted in FIG. 1, the storage appliance system 100 contains a file system cluster 120 with file system nodes 121, 122, 123 that are used to store and archive data provided to the storage appliance system 100. The file system nodes in cluster 120 are not directly visible to end users or administrators of the storage appliance system 100, but rather are interfaced through a management node 130 that is configured to receive system commands. The management node 130 is then interfaced with a service control node 140 which may be used to monitor system operation and provide control of the system to a local or remote administrative user. The various node types are connected to each other through network connections such as via an Ethernet or fibre channel connection. The physical configuration of the storage appliance (such as in a standalone rack 110) provides shared network switches, power distribution units, and other hardware devices used by the various nodes.

A large number of hardware and software subsystems operate within the file system nodes to perform the storage appliance functions, such as storage management software, database management systems, application servers, and the like. In FIG. 1, each file system cluster operates sets of connected storage management software 151, 152, 153, database management systems 161, 162, 163, and application servers 171, 172, 173 may in turn interface with each other to operate the variety of processes needed to perform data storage, retention, archiving, deduplication, and retrieval functions on storage hardware devices such as tape 181 or disk 182.

The management node 130 needs to obtain a way to access the file system nodes (the cluster nodes) and perform relevant actions in the various nodes' databases, storage volumes maintained on file systems such as tape 181 or disk 182, and other internal subsystems. Each of these subsystems maintains at least one, but often multiple, user accounts. Therefore, there is a large amount of authentication information required to properly interface with each of the subsystems operating on each file system node. For security purposes, although the service control node 140 provides an administrator with the ability to perform maintenance and operational actions within the cluster, there is no way to directly interface with the internal user accounts of the cluster's subsystems.

As a further complexity, a variety of changes may occur within the computing system 100 that may require changes or updates to the user authentication information. For example, nodes may be added, removed, or replaced within the file system cluster 120 such as by the replacement of the physical hardware unit comprising a file system cluster node. This would result in new authentication information being needed for every software subsystem running on the replaced file system cluster node. Likewise, authentication failures or other changes within the subsystems or nodes may require new authentication information or passwords and keys to be reset. The following techniques allow for the possibility of resetting and reestablishing the relevant authentication credentials in response to such failures and changes.

In an embodiment of the present invention, a special user account is maintained to manage administrative privileges and access for a variety of internal user accounts. This enables consolidation of a plurality of internal user accounts used in multiple subsystems. This special user account is further referred to in the following disclosure as an "internal" superuser account. The internal superuser account may be used to automate user management of internal accounts by storing and tracking authentication information for each account, changing account passwords at regular intervals, managing keys and credentials, and facilitating authentication between internal and external subsystems. The internal superuser account is distinguishable from a "root" account because it does not have preeminent system-wide access to all subsystems, but rather the internal superuser account is a construct for managing a plurality of internal (generally hidden) accounts in each of these subsystems.

The internal superuser account may be deployed in connection with an authentication manager component or system to exchange or provide passwords between a set of components that need to access each other. For example, in a storage appliance, a management node subsystem and a file system node subsystem may need to access and allow access to each other's user accounts, and likewise, subsystems in a file system node clusters such as a database management system and storage management software may need to communicate with each other using internal accounts with varying levels of privileges.

Figure 2:
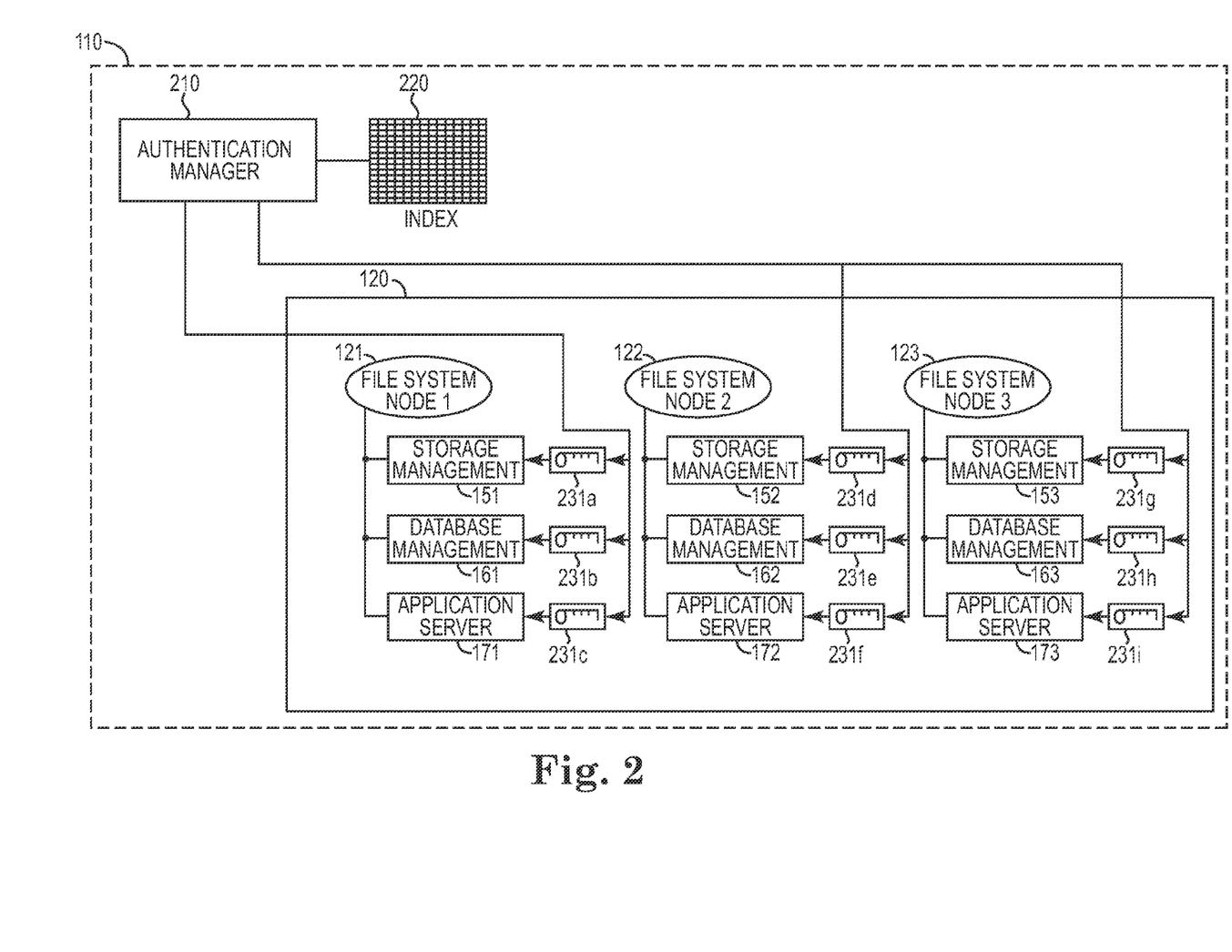
FIG. 2 illustrates use of an authentication manager interfacing within a storage appliance system used in connection with embodiments of the present invention.

FIG. 2 provides an illustration of storage appliance components adapted for use with the presently described authentication manager. As shown, authentication manager 210 is connected to an index 220 used to track and store authentication information for a plurality of subsystems in file system cluster 120. As shown, authentication manager 210 is interfaced with file system nodes 121, 122, and 123. Authentication manager 210 provides passwords for the user accounts of: the storage management subsystem on each node as shown in 231a, 231b, and 231c; the database management subsystem on each node as shown in 231d, 231e, 231f; and the application server on each node as shown in 231g, 231h, 231i.

As further discussed below, the authentication manager 210 may be used to not only track and provide user account identifiers and passwords, but may also to establish password and authentication updates between separate systems and subsystems. Further, the authentication manager may be configured to provide recovery from failed updates and out-of-sync passwords by resetting the authentication information to a default or other resettable factory initiated state, and process newly connected nodes and subsystems with known default passwords.

The internal superuser account may be externally represented as a single user to allow management and control via user interfaces and other tools. The internal superuser account may be configured to control and manage user accounts with different levels of access, but the internal superuser may be configured to operate as an internal user with full or as-necessary access to all or substantially all internal systems. Moreover the internal superuser may be configured to store and manage all of the user account credentials needed by multiple internal subsystems, whether for an administrative user or a restricted user.

In one embodiment, the authentication manager facilitates password management of a plurality of internal accounts. Components and subsystems requiring an internal user are accessible with a default/factory password that is pre-built into each component. Each subsystem contains a capability to both reset the various systems and subsystems to a known default password, and ultimately change and maintain the current password.

The password for each user account maintained within each appropriate subsystem may be automatically changed by the authentication manager upon initial configuration of the larger computing system by the customer. From this point forward, the passwords are changed at a regular interval (such as every six months) to a password newly generated by the authentication manager. All components or subsystems that are responsible for maintaining user repositories are synchronized to reset and receive the newly generated password for continued operations.

If a component or subsystem fails to handle the password change, its password is reset to the factory default using a utility or other feature that is built-in to the component or subsystem. This allows the authentication manager to re-establish communications using the default password, and then shortly thereafter change and manage the password in a new refreshed state. This strategy allows components to be easily added to the system, and while minimizing the use of the factory default password to initial configuration or to reset inaccessible communications.

In further embodiments, the internal superuser may be configured to manage communication between internal system nodes and external nodes, and communication between internal nodes. In the case of communication between nodes outside the cluster and nodes within the cluster, this communication may occur from the management node of a storage appliance to nodes within a file system cluster. As previously suggested, for security reasons the internal subsystems (such as the file system cluster 120 referenced in the storage appliance of FIG. 1) are typically not configured to allow direct interfacing with internal storage subsystems such as databases and disks. The internal superuser and authentication manager may be employed to manage access to each of these accounts and provide a secure capability to perform actions with external interfaces.

To enable the internal superuser to maintain access to all of the internal accounts of the subsystems operating in the file system cluster, a complete set of user authentication information for every internal user account needs to be tracked with the authentication manager. A set of internal user accounts is created on each of the cluster nodes as needed for operation of each of the various subsystems (such as the internal user accounts needed for the storage management software, internal user accounts needed for the database, etc.). The password of the internal user accounts are then generated and automatically updated periodically on each cluster node.

Continuing with the example of the storage appliance, the internal accounts that are created within cluster nodes may be used for program communication from nodes outside of the file system cluster to nodes in the file system cluster. For example, this may be program communication from the management console node to the individual subsystems provided by the file system cluster. The password for the internal accounts in each of the subsystems (such as the storage management systems, database management systems, and application servers) will be changed after the customer finishes configuration of the appliance and will be regenerated periodically as suggested above.

The updated password will be saved in encrypted format in the index provided by the authentication manager. The authentication manager queries the password of internal accounts from the index when needing to perform tasks in cluster nodes. Thus, the tasks may be performed without the involvement of any users or user interfaces by the authentication information provided by the superuser account.

In case one of the internal passwords used within the cluster nodes becomes out of sync with the internal superuser, a reset process can be initiated. Once an attempt to access the node fails using the last known password for the node, the node is transparently reset back to a hard-coded default password. If the reset is successful, the authentication manager may then communicate with the node and trigger the creation of a new password.

In case one of the cluster nodes needs to be replaced or a new cluster node is added, a similar process is initiated using communications with the known hard-coded default password for the node. Again, if communication with the new node is successful, the authentication manager may then communicate with the node and trigger the creation of a new password. The cycle of maintaining and updating the password and other authentication information may be conducted as previously described.

Figure 3:
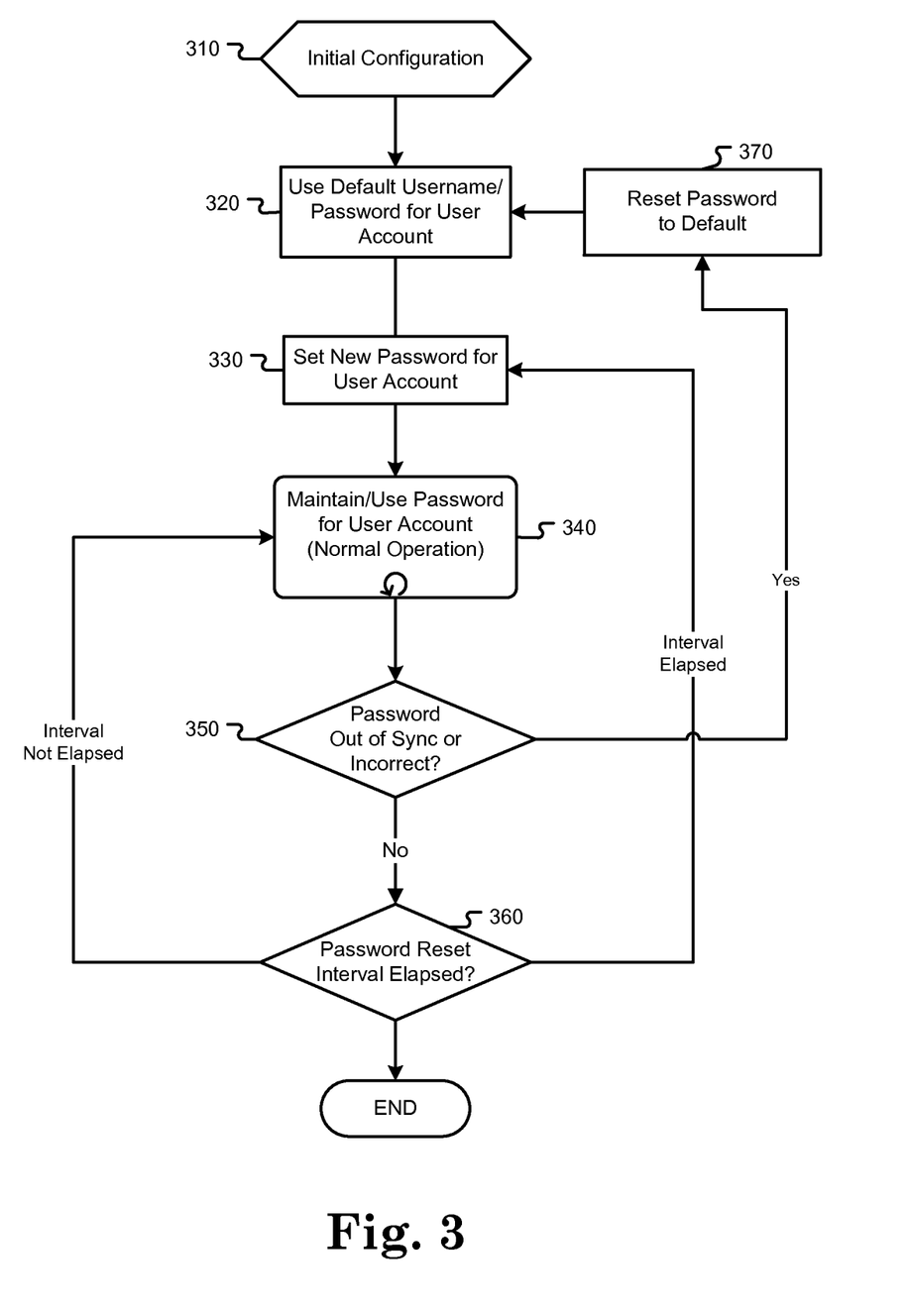
FIG. 3 illustrates a flowchart demonstrating password management features used in connection with embodiments of the present invention.

FIG. 3 illustrates a flowchart of an example procedure for maintaining and updating passwords according to one embodiment of the presently described invention. During the state of initial configuration as in step 310, a default username and password will be used to access the internal user account in the node or other subsystem as in step 320. Next, as in step 330, a new password will be set for the user account by the authentication manager. This updated password and other updated authentication information will be maintained and used to access the user account during normal operations as in step 340.

If the password that is maintained and used for a particular internal user account becomes out of sync as in step 350, or otherwise fails to successfully establish access to the node or subsystem, then the password is reset to its known default as in step 370. This reset takes place both on the subsystem and on the authentication manager which is managing the password. Likewise, if a password reset interval has elapsed and the password is required to be reset or otherwise changed as in step 360 (such as based on a password expiration interval in a security policy), then the password is changed to a new value for the user account as in step 330. This enables the authentication manager to restart the authentication process by maintaining this new username/password combination in step 340, while the capability for reset to default will remain available in case the password is out of sync and no longer fails to function.

In another embodiment, the authentication manager may be configured to manage secure access within an internal system or among a set of cluster nodes through use of SSH key based authentication. This authentication may comprise an automated periodic refresh of SSH keys without any disruption. This is accomplished by regenerating and communicating the new key pairs to all nodes. The refresh process ensures cluster communication is unaffected while this update is taking place. During normal operation, the authentication manager will maintain the SSH keys to provide access to the various nodes and subsystems as appropriate.

For example, in a storage appliance, SSH keys must be unique per appliance and regenerated at a regular interval such as every 90 days. The key authentication mechanism is used for internal cluster communication among the nodes and subsystems. Communication between internal nodes within the storage cluster nodes may require key authentication to authenticate that the node is a valid internal node, or the key may be used in connection with encrypted communications. Each node maintains its own private key to verify incoming public keys, and each node further maintains a list of public keys used to communicate with other nodes in the cluster. The authentication manager assists the nodes by refreshing and communicating the public keys as appropriate, and informing the nodes when old sets of keys may be discarded.

The pair of public-private keys in each node will be regenerated periodically and the new public key will be pushed to other nodes for update. During the key update process, the following described procedure ensures that all nodes continue to communicate with each other using the old keys until new keys are instated and verified to be working The old pair is revoked as the final update step.

A number of safeguards to this procedure may be used to prevent an incomplete state from developing after key refreshing. If one or more of the nodes are down or inaccessible, the keys will not be regenerated. In this case the refresh process may be attempted sporadically, such as by retrying once a day until each of the nodes is up. If any of the machines are currently allowing 2 keys, one of the keys will be removed. This may happen if a machine went down in the middle of the update previously. There is a short period of time where 2 keys are allowed. If one or more of the machines go down in the middle of the process all changes will be backed out. In this case we will retry once a day until all the machines are up.

Figure 4:
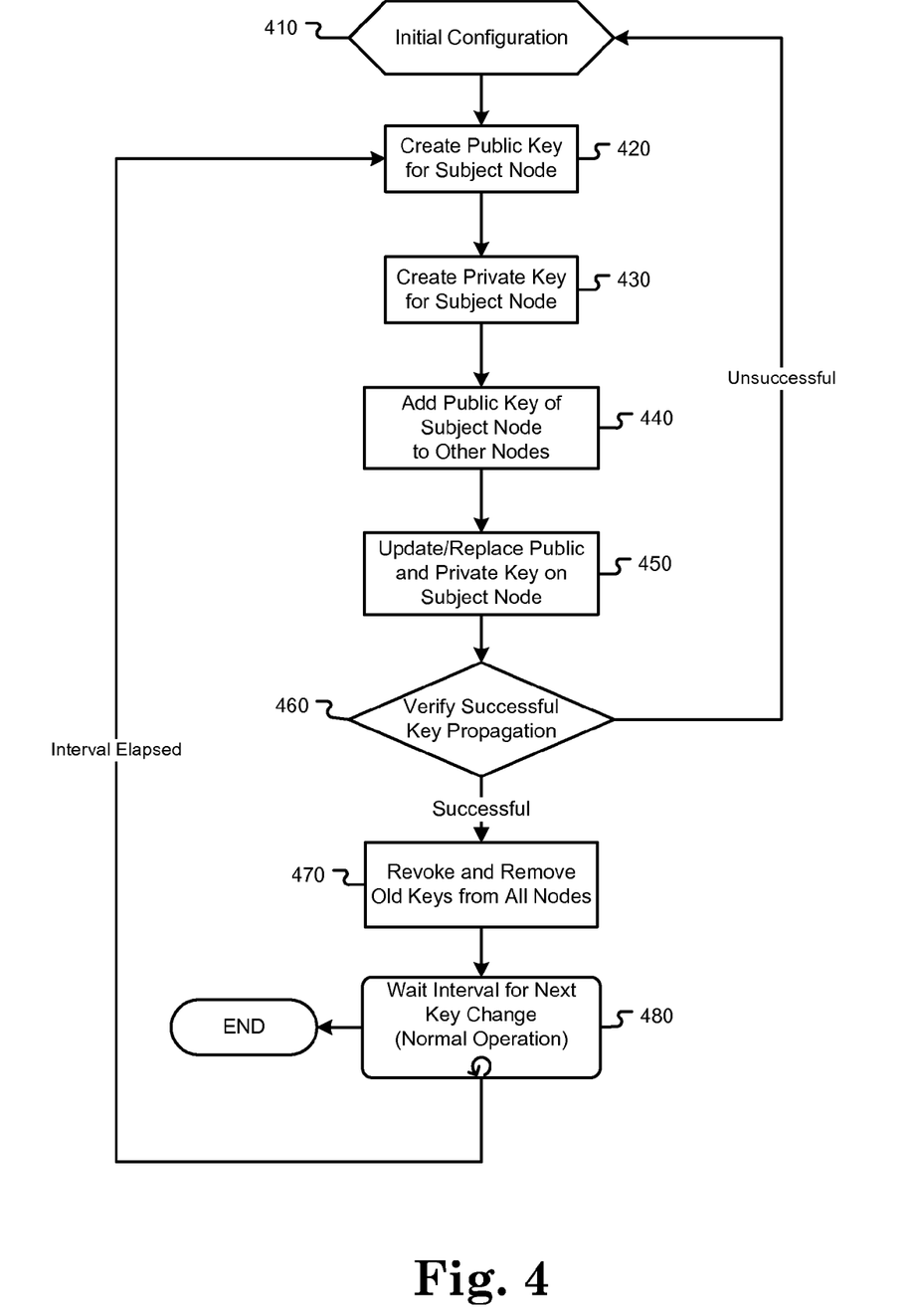
FIG. 4 illustrates a flowchart demonstrating authentication key management features used in connection with embodiments of the present invention.

FIG. 4 illustrates a flowchart of an example procedure for regenerating and replacing authentication keys from a subject node to a set of other nodes according to one embodiment of the presently described invention. After initial configuration of the nodes as in step 410, a public key is generated for the subject node on the subject node as in step 420, and a private key is generated for the subject node on the subject node as in step 430. This public key will be communicated to other nodes in the cluster to enable secure and authenticated communications to the subject node (and vice versa with authentication key combinations used for communication with these other nodes).

Next, the public key that has been generated for the subject node is updated or replaced on other nodes in the cluster as in step 440. At this point, both new and old keys are allowed temporarily on all nodes. The public and private key on the subject node may then be updated or replaced for communication uses on the subject node as in step 460. Ultimately the private key/public key combinations employed by the other nodes (and used for communications with these other nodes) will be replaced in a similar fashion as in the preceding steps.

Successful key propagation may be verified by checking that the node communications are successful with use of the newly deployed keys as in step 460. If successful, all old keys may be revoked and removed from all nodes as in step 470, thereby allowing only the use of the new keys on all nodes. If unsuccessful, then the process returns to an initial configuration to abandon the use of the new keys and restart the process of creating and deploying a new set of public and private keys. If successful, the system can then wait the predefined interval and function with the currently propagated keys as in step 490 until the next key change.

The techniques described above generally enable the creation and use of an internal superuser through the use of an authentication manager or other internal authentication coordinator. This enables a management console, service console, or other external system to obtain full or necessary control over the internal components of a complex computing system, without use of a root login. Those skilled in the art would recognize that a number of variations to the authentication manager and the authentication processes described above might be used in connection with additional internal or external systems for an internal superuser.

In a further embodiment, the techniques described herein may be extended to management of other user accounts, keys, passwords, and other authentication information and techniques that may be internally or externally used. For example, a system administrator or a general maintenance user might be interested in creating a superuser account capable of managing authentication credentials for a plurality of internal and external users. This is especially useful due to the presently described feature of updating passwords at regular intervals, and consolidating access to multiple user accounts on multiple subsystems with a single account. Therefore, this superuser account, when created, can be configured to access subsystems on all or substantially all nodes in a single larger system. This enables a single user account to access and manage a variety of credentials and account authentications.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for performing automated management of credentials, the method comprising:

initially communicating with a plurality of components using default authentication credentials as current authentication credentials corresponding to a plurality of internal user accounts, wherein each of the components provides instances of each of the internal user accounts, and each of the instances of the internal user accounts is accessed with a corresponding current authentication credential;

changing the current authentication credentials of the corresponding internal user accounts from the default authentication credentials to first authentication credentials;

tracking the current authentication credentials of the corresponding internal user accounts in an index;

changing the current authentication credentials of the corresponding internal user accounts from the first authentication credentials to new authentication credentials, and updating the current authentication credentials of the corresponding internal user accounts tracked in the index with the new authentication credentials during each of a series of predefined intervals;

retrieving the current authentication credentials of the corresponding internal user accounts from the index and using the retrieved current authentication credentials for accessing the corresponding internal user accounts throughout the plurality of components, wherein each of the plurality of components accesses the instances of the internal user accounts corresponding to other components using the current authentication credentials of the index; and updating the current authentication credentials of the plurality of components to the new authentication credentials and tracking the new authentication credentials as the current authentication credentials in the index, wherein the updating occurs during each of a predefined interval of time defined for credential refreshing.

2. The method of claim 1, wherein changing the current authentication credentials of the corresponding internal user accounts comprises changing a password for each of the internal user accounts.

3. The method of claim 1, further comprising resetting the current authentication credentials for a first corresponding internal user accounts on one or more of the plurality of components, and resetting the current authentication credentials tracked in the index to the default authentication credentials for the first internal user account, responsive to the current authentication credentials tracked in the index being unable to successfully authenticate with the instances of the first corresponding internal user account within the plurality of components.

4. The method of claim 3, wherein resetting the current authentication credentials is performed responsive to being unable to communicate with one or more of the plurality of components within a defined period of time using the current authentication credentials tracked in the index.

5. The method of claim 1, wherein the tracked current authentication credentials are stored in an encrypted format in the index.

6. The method of claim 1, further comprising querying the index to obtain the current authentication credentials to access and communicate with one or more of the plurality of components and perform one or more tasks with the one or more of the plurality of components.

7. The method of claim 1, further comprising adding a new component to the plurality of components, thereby resulting in changing and tracking additional current authentication credentials of additional internal user accounts associated with the new component.

8. The method of claim 1, wherein the current authentication credentials of the corresponding internal user accounts include a username and a password.

9. The method of claim 1, wherein the current authentication credentials of the corresponding internal user accounts include a set of keys.

10. The method of claim 9, wherein the set of keys comprises SSH keys unique per each component in the plurality of components.

11. The method of claim 9, wherein changing the current authentication credentials for a set of keys comprises, for each subject component in the plurality of components:
- generating a new public key for the subject component on the subject component;
- generating a new private key for the subject component on the subject component;
- replacing previous keys provided for authentication with the subject component, including replacing the previous keys provided to other components in the plurality of components, and replacing use of any previous public key and previous private key on the subject component responsive to successful replacement of the new public key on the other components in the plurality of components.

12. The method of claim 1, further comprising deploying an authentication component to exclusively maintain and access the current authentication credentials in the index, thereby providing authentication to the internal user accounts exclusively with use of the authentication component.

13. A computing system, comprising:
- a plurality of components, each of the components providing a plurality of internal user accounts used for obtaining access to a plurality of corresponding functions, wherein each of the components provides instance of each of the internal user accounts, and each of the instances of the internal user accounts is accessed with a corresponding current authentication credential;
- default authentication credentials corresponding to each of the internal user accounts;
- an index configured to store the default authentication credentials and current authentication credentials corresponding to each of the internal user accounts;
- an authentication manager operably coupled to the index and configured to update and manage the current authentication credentials used to access each of the internal user accounts, by:
- initially communicating with the plurality of components using the default authentication credentials;
- generating first authentication credentials for use as the current authentication credentials;
- changing the current authentication credentials of the corresponding internal user accounts from the default authentication credentials to the first authentication credentials;
- retrieving the current authentication credentials from the index to communicate with each of the instances of the internal user accounts in the plurality of components, wherein each of the plurality of components accesses the instances of the internal user accounts corresponding to other components using the current authentication credentials of the index; and
- updating the current authentication credentials of the plurality of components to new authentication credentials and tracking the new authentication credentials as the current authentication credentials in the index, wherein the updating occurs during each of a predefined interval of time defined for credential refreshing.

14. The system of claim 13, wherein the current authentication credentials include a username and a password.

15. The system of claim 13, wherein the authentication manager is further configured to reset the current authentication credentials to the default authentication credentials in the index, and reset the corresponding internal user accounts on one or more of the plurality of components to the default authentication credentials, responsive to the current authentication credentials being unable to authenticate with one or more of the corresponding internal user accounts within the plurality of components.

16. The system of claim 15, wherein performing the reset of the current authentication credentials is conducted responsive to being unable to communicate with one or more of the plurality of components.

17. The system of claim 13, wherein the current authentication credentials include a set of keys unique to each component in the plurality of components.

18. The system of claim 17, wherein the set of keys are SSH keys used to communicate between each of the plurality of components.

19. The system of claim 17, the authentication manager is further configured to change the current authentication credentials for a set of keys, including for each subject component in the plurality of components:
- generating a new public key for the subject component on the subject component;
- generating a new private key for the subject component on the subject component;
- replacing previous keys provided for authentication with the subject component, including replacing the previous keys provided to other components in the plurality of components, and replacing use of any previous public key and previous private key on the subject component responsive to successful replacement of the new public key on the other components in the plurality of components.

20. A method for performing automated management of authentication credentials in a computing system, comprising:
- initially communicating with a plurality of components using default authentication credentials as current authentication credentials corresponding to a plurality of internal user accounts in the computing system, wherein each of the components provides instances of each of the internal user accounts, and each of the instances of the internal user accounts is accessed with a corresponding current authentication credential;
- storing the current authentication credentials in an index, the current authentication credentials providing access to the plurality of internal user accounts within the corresponding components of the computing system;
- changing the current authentication credentials of the corresponding internal user accounts from the default authentication credentials to first authentication credentials;
- tracking the current authentication credentials of the corresponding internal user accounts in an index;
- changing the current authentication credentials of the corresponding internal user accounts from the first authentication credentials to new authentication credentials, and updating the current authentication credentials of the corresponding internal user accounts tracked in the index with the new authentication credentials during each of a series of predefined intervals;
- retrieving the current authentication credentials of the corresponding internal user accounts from the index and using the retrieved current authentication credentials for accessing the corresponding internal user accounts throughout the plurality of components, wherein each of the plurality of components accesses the instances of the internal user accounts corresponding to other components using the current authentication credentials of the index; and
- updating the current authentication credentials of the plurality of components to the new authentication credentials and tracking the new authentication credentials as the current authentication credentials in the index, wherein the updating occurs during each of a predefined interval of time defined for credential refreshing.

* * * * *